Feb. 23, 1943.   F. B. PFEIFFER   2,312,049
METHOD AND APPARATUS FOR WORKING SHEET MATERIAL
Filed March 16, 1940   2 Sheets-Sheet 1
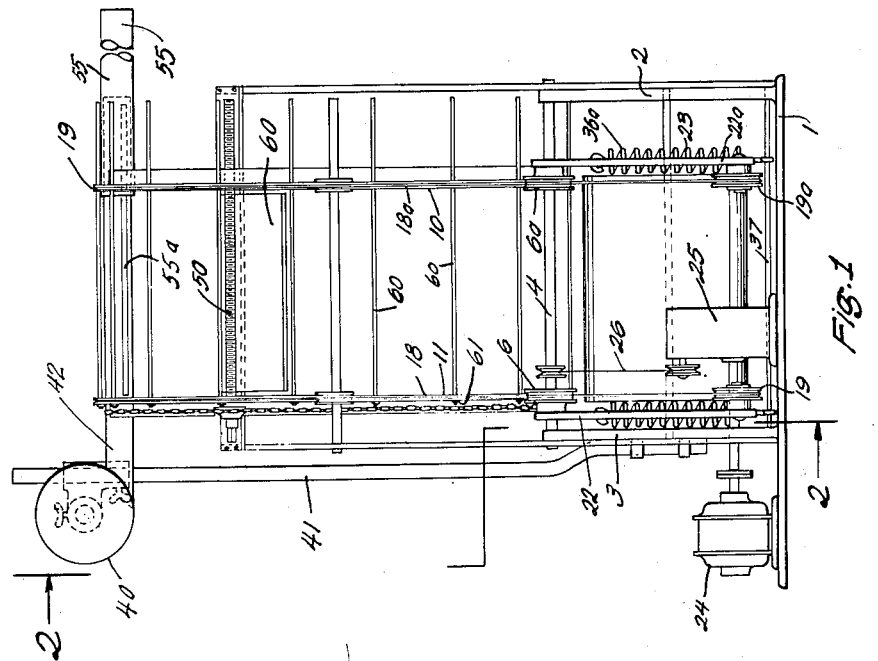
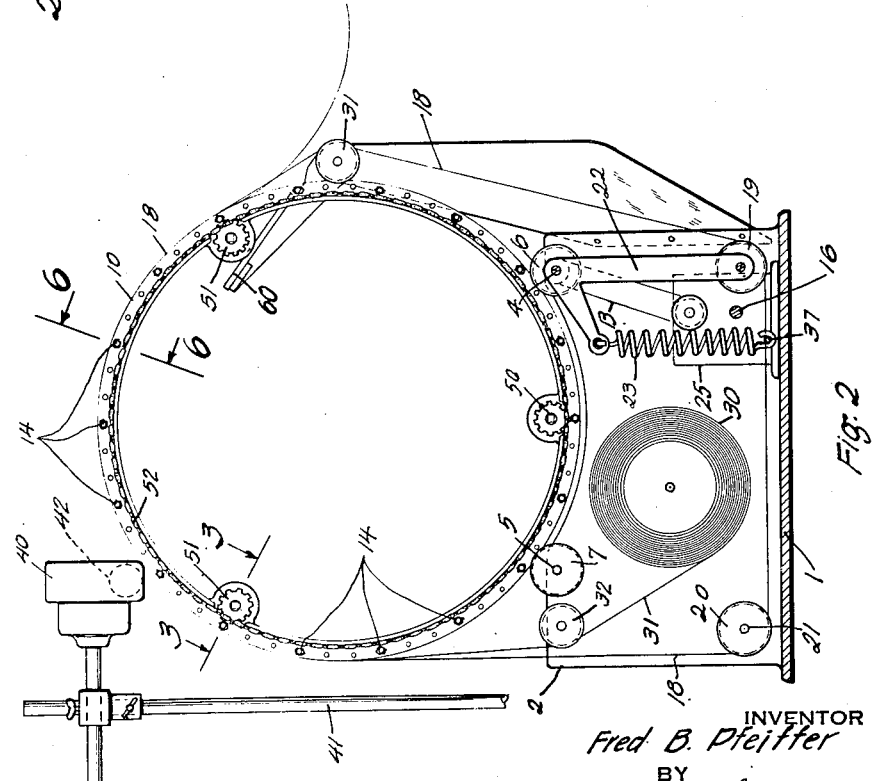
INVENTOR
Fred B. Pfeiffer
BY
ATTORNEY Feb. 23, 1943. F. B. PFEIFFER 2,312,049
METHOD AND APPARATUS FOR WORKING SHEET MATERIAL
Filed March 16, 1940 2 Sheets-Sheet 2
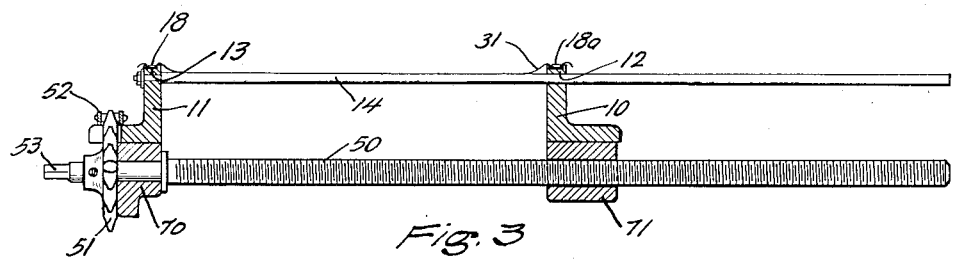
Fig. 3
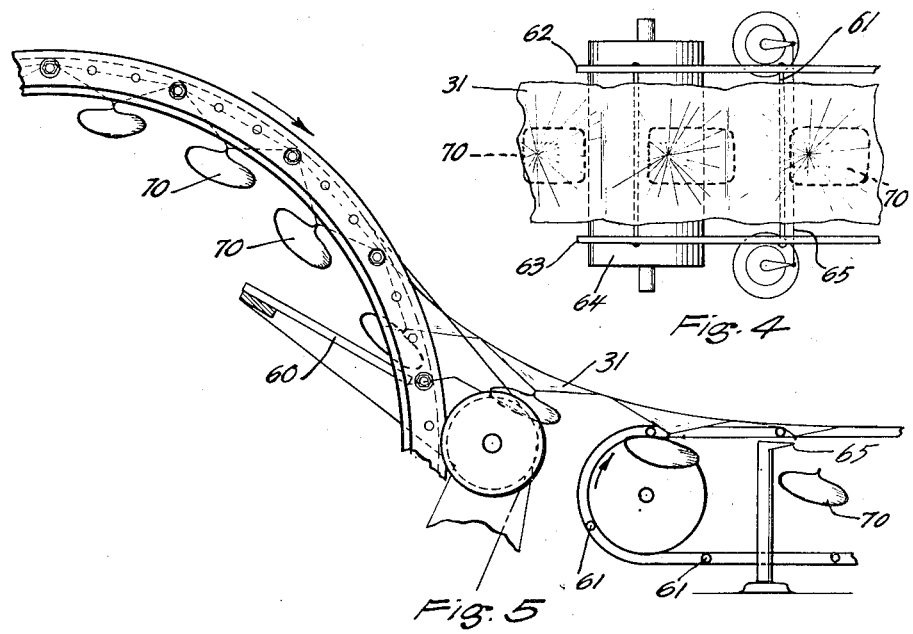
Fig. 4
Fig. 5
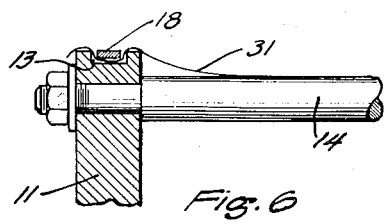
Fig. 6
INVENTOR
Fred B. Pfeiffer
BY
Jesse R. Brown
ATTORNEY Patented Feb. 23, 1943

2,312,049

UNITED STATES PATENT OFFICE 2,312,049

METHOD AND APPARATUS FOR WORKING SHEET MATERIAL

Fred B. Pfeiffer, Akron, Ohio

Application March 16, 1940, Serial No. 324,355

15 Claims. (Cl. 18—19)

This invention relates to an improved method of wrapping articles and to novel apparatus for practicing such method. The invention carries forward the broad inventive concept disclosed in my co-pending applications Serial No. 193,214, filed February 28, 1938, and Serial No. 312,507 filed January 5, 1940, and it adds thereto certain steps in the method and features of machine construction and operation having practical importance.

The invention contemplates wrapping or packaging, either partly or completely, various objects with a film or sheet of such a nature as to be capable of conforming to any desired shape to accommodate the object or article or material being wrapped or packaged. In some practices of the invention such film or sheet material is preferably moisture proof and impermeable to air or other gases and heat sealable, that is, capable of having engaging portions fused together when heated. One such material which is suitable for practicing the invention and which is commercially available is a rubber hydrohalide, more specifically a rubber hydrochloride, manufactured by the Goodyear Tire & Rubber Company of Akron, Ohio, under the trade name of "Pliofilm," such material being more specifically described in the Calvert Patent No. 1,989,632 of January 29, 1935.

One feature of the invention contemplates supporting and holding edge portions of an appropriate strip of wrapping material, softening the material by heat, and thereafter molding it to the desired shape by direct contact with the object or article or material to be packaged. The molding just referred to may be accomplished by thrusting the object or article or material against the surface of the wrapping material that is being held for this purpose. This operation results in stretching the mid portion of the film or sheet, the amount of stretch being selective according to the particular article being packaged.

Another feature of the invention resides in novel combinations of simple mechanical elements making possible rapid repetition of packaging operations.

Still another feature of the invention is the provision for supplying film or wrapping material to the packaging station in a heated and softened condition suitable for the stretch-wrap packaging operation.

Yet another feature of the invention is the provision of adjustable clamping means whereby various widths of strips of film or wrapping materal may be used as well as various linear amounts of the strip as required or desired for any particular object or article or material being packaged, it being practical and convenient to adjust the clamping or holding means for these changes of area of the film or wrapping material whereby efficient use of the film or wrapping material is effected.

A further feature of the invention is the enclosing, either partially or completely, within a single strip of wrapping material a plurality of packages connected in spaced relation by a continuous web of the wrapping material.

More specifically, one form of the apparatus for practicing the invention comprises a pair of annular supporting members spaced from each other in axial alignment and mounted for rotation in unison and being adjustable toward and from each other and connected by circumferentially spaced cross-members in the form of pins. Means are provided for supplying sheet material to the peripheries of the annular members for engagement by two endless clamping members. These clamping members are in the nature of endless wires or bands and are adapted to revolve with the annular members wherein they engage in peripheral grooves to clamp the edges of a strip of sheet material. The sheet material is drawn from a stock roll to a packaging station, and during such travel it is subjected to heat of sufficient degree to render it stretchable and in some instances fuseable. Rotation of the annular supporting members and their associated parts may be either continuous or intermittent as desired, and may be effected either manually or mechanically.

The foregoing and other objects, features and advantages of the invention will be readily appreciated from the following description in connection with the accompanying drawings wherein one form of the invention has been shown by way of illustration, and wherein Figure 1 is a side elevation of one form of machine embodying the invention;

Figure 2 is another side elevation of the machine as seen at right angles to Figure 1;

Figure 3 is a fragmentary longitudinal sectional view taken approximately on line 3—3 of Figure 2;

Figure 4 is a fragmentary top plan view of a take-off conveyor disposed at the delivery side of the machine;

Figure 5 is a fragmentary view similar to Figure 2 but on a larger scale and further showing said take-off conveyor; and Figure 6 is an enlarged fragmentary sectional view taken approximately on line 6—6 of Figure 2.

Referring now to the drawings in detail it will be seen that the illustrated embodiment of the invention comprises a base 1 with a pair of upwardly extending frame plates 2 and 3 which are spaced from each other and substantially parallel with each other. Journalled for rotation in said plates 2 and 3 and extending transversely between them are a pair of shafts 4 and 5 which respectively support grooved rolls 6, 6a and 7 7a. The upper edges of said rollers extend above the frame plates 2 and 3 and are so spaced with reference to each other as to constitute supports for a pair of annular members 10 and 11. As best shown Fig. 3 these annular members 10 and 11 are of L shaped cross-section and have their peripheries formed with annular grooves 12 and 13. At appropriately spaced circumferentially spaced points the annular flange portions of the members 10 and 11 are apertured for the selective accommodation of a plurality of cross-members 14 each of which has one of its ends anchored in the annular member 11 while its other end is extended through and beyond the annular member 10. In Fig. 2 there are eighteen of these cross-members or cross-bars 14, but the particular member employed and the spacing between them may be varied in accordance with the size of the object to be wrapped.

A pair of endless wires or bands 18 and 18a are disposed respectively in the grooves 13 and 12 at the upper portions of the annular members 11 and 10, and said endless wires or bands are also threaded about pulleys 19, 19a and 20, 20a. The pulleys 20 and 20a mounted on an appropriate shaft 21 which is mounted in and between the frame plates 2 and 3, whereas the pulleys 19 and 19a are rotatably mounted in the end of bell-crank levers 22 and 22a which are influenced by tension springs 23 to maintain proper tension upon the endless wires or bands 18 and 18a. The shaft 4 is preferably driven by power from a motor 24 through a speed reduction gear 25 and belt 26, and when so rotated the shaft 4 carries with it the grooved rolls 6 and 6a which in turn transmits rotary motion to the annular members 10 and 11 and their associated parts.

From a stock roll 30 a strip or web of the wrapping material previously described is drawn upwardly past a guard roll 32 to the periphery of the circular cage comprising the annular members 10 and 11 and the cross-members 14, and thence said wrapping material travels with said cage until it reaches substantially the opposite side of the machine. The arrangement is such that the width of the strip material 31 is slightly greater than the distance between the grooves 12 and 13, and as a result, the side edges of said material 31 become positioned under the endless wires or bands 18 and 18a and are clamped thereby and firmly held in subsequent movement with the cage. While so held, the wrapping material 31 eventually reaches a wrapping position adjacent the top or upper side of the cage, and in effect it provides an endless succession of wrapping material blanks each of which defined between the two annular members 10 and 11 and any two successive cross-members 14.

Immediately before reaching the wrapping position or wrapping station, the sheet material 31 is heated sufficiently to render it soft and stretchable and preferably fusible. This heating may be accomplished in numerous ways, the illustrated embodiment comprising an electrically driven hot air blower 40 which appropriately supported on a stand 41 and equipped with a longitudinally slotted outlet pipe 42 which extends transversely over the cage. The temperature of the warm air blast that the pipe 42 distributes to the passing sheet material may of course be varied as desired dependent upon the selected wrapping material and the amount of stretchiness to be imparted thereto.

As the so heated material arrives at or passes by the wrapping position or wrapping station the article or object or material to be wrapped is thrust against the sheet at a point substantially midway between two of the cross-members 14 thus depressing or deforming that portion of the sheet and stretching it. Immediately thereafter the attendant or operator will grasp the partly covered object from within the cage and will complete the covering therof by twisting or crimping. These operations are then duplicated successively as additional portions of the sheet material 31 come into position and they may be carried out either while the cage is rotating continuously or while it is stopped during intermittent motion. Incidentally it is to be noted that the motor 24 and its driving connection may be eliminated, leaving the cage free to be turned manually by the operator in conjunction with the wrapping operation.

In Figs. 4 and 5 of the drawings the invention is shown in use for wrapping individual cakes of soap designated by the numeral 70. This use is merely illustrative and it will be understood that the invention is equally adaptable for wrapping fruits, candies, toilet goods in bottles and boxes, brushes, toys, packaged foods, tobacco products and many other articles of manufacture and commerce. Obviously the distance between the annular supporting members 10 and 11 and the distance between the cross-bars 14 may be either enlarged or reduced in accordance with the size and shape of the particular articles to be wrapped.

When it is desired to use sheet materials of different widths the machine may be adjustable as best shown in Figs. 1, 2 and 3. Thus at suitably spaced intervals the annular members 10 and 11 may be connected together by adjusting screws 50 each of which carries at one end a sprocket wheel 51 meshing with an endless sprocket chain 52 encircling the cylindrical flange portion of the annular member 11. The outer end of each screw 50 may be formed square or otherwise as shown at 53 for accommodation of a suitable wrench, and when such wrench or other tool is used to turn one of the screws 50 the other screws will be turned in an equal amount in the same direction by reason of the chain and sprocket connection. Of course it is to be understood this width-wise adjustment may be omitted in some machines. When it is used, however, it is preferable to equip the end of the blower pipe 42 with a longitudinally adjustable sleeve 55 so that the extent of the warm air blast over the wrapping material may be regulated in accordance with the adjustment of the machine for different widths of wrapping material.

After the successive objects or articles have been wrapped as above described they are carried away from the wrapping station by the subsequent or continuing rotation of the cage until they come to the point where the endless wires or bands 18 and 18a leave the annular members 11 and 10 respectively releasing the corresponding edge portions of the sheet material. In such movement of the parts (as can best be seen in Fig. 5) the wrapped objects or articles are suspended below and between the successive cross-members 14 but connected together by a continuous web of unused wrapping material. This continuous web with the wrapped object or article may be withdrawn from the delivery side of the machine in any desired manner and they may be left connected together or they may be separated and trimmed to suit particular merchandising practices or preferences. One means for accomplishing this is shown in Figs. 4 and 5 and comprises an annularly arranged guide plate 60 which is suitably supported within the cage below the point at which the endless bands 18 and 18a release the edges of the sheet material. Near this same point but at the outer side of the cage there is an endless conveyor comprising a plurality of pusher bars 61 extending transversely between a pair of relatively spaced chains or belts 62 and 63 which rotate about a pulley or drum 64. The arrangement is such that the successive pusher bars 61 come into position behind the successive wrapped articles dangling from the delivered web and carries them away from the cage. As the latter motion continues the twisted or crimped portions of the wrapping material adjacent the upper side of the wrapped article are pushed against an electrically heated wire 61 which instantly cuts the engaged material and completes the sealing of the severed wrapped article. It is to be noted, and it is an important feature of this invention, that the cutting by the hot wire just referred to accomplishes an additional and further result than severing the wrapped object with its cover from the continuous web of sheet wrapping material. This additional and further result is the sealing or fusing of the edge of the gathered sheet material as it is cut so that in the case of a package, such as illustrated in Fig. 5, no further application of heat to the cut portion is necessary to assure complete and permanent closing of the wrap about the object being packaged. The importance of cutting and sealing or fusing the cut portions at the time of cutting will be more readily appreciated as it pertains to this invention when it is considered that sheet wrapping materials such as "Pliofilm" softens and their stretchability increases substantially at a temperature below that required to cause such material to fuse or seal. In practical operation of this invention it has been found that in wrapping some types of merchandise that it is desirable to wrap with the sheet wrapping material at a temperature below its fusing point, consequently it will be seen that while the wrapping material may be gathered together by twisting or crimping that when severed by a conventional method of cutting as with a cold knife or shears that the cut portion would not be sealed or fused together and would not be air tight, whereas if a heat sealable wrapping material is cut with a cutter whose temperature is sufficient to raise the temperature of the wrapping material to its self-sealing or fusing temperature that the cut portion will be cut and sealed at the same time.

Obviously the invention is susceptible to modifications other than those illustrated and described, and the right is reserved to make such changes as fall within the scope of the appended claims without departing from the spirit of the invention.

I claim:

1. A machine of the class described comprising a rotatable cage having annular end members connected by circumferentially spaced cross-members defining between them a plurality of openings for passage of articles to be wrapped, means for rotating said cage continuously, a pair of endless clamping wires operable in substantial arcuate contact with the peripheries of the end members of the cage, and means for supplying stretchable sheet material to the periphery of the cage so that edge portions of said sheet material will be clamped by said wires and thus firmly held over said openings whereby said sheet material is positioned for stretch-wrapping operations.

2. A machine of the class described comprising a rotatable open or hollow cage having annular end members connected by circumferentially spaced cross-members defining between them a plurality of openings for the passage of successive articles to be wrapped, said annular end members being relatively adjustable toward and from each other, means for rotating said cage, means for supplying stretchable sheet material to the periphery of said cage to overlie said opening, and means for clamping edge portions of said sheet material to the annular end members of the cage.

3. A machine of the class described comprising a rotatable open or hollow cage having annular end members connected by circumferentially spaced cross-members defining between them a plurality of openings for the passage of successive articles to be wrapped, said cross-members being selectively adjustable to different relative spacings, means for rotating said cape, and means for firmly holding the stretchable sheet material against part of the periphery of the cage whereby to present such material to wrapping positions overlying said openings.

4. A machine of the class described comprising a rotatable cage having annular end members connected by circumferentially spaced cross-members defining between them a plurality of openings for passage of articles to be wrapped, means for rotating said cage continuously, a pair of endless clamping wires operable in substantially arcuate contact with the peripheries of the end members of the cage, and means for supplying stretchable sheet material to the periphery of the cage so that edge portions of said sheet material will be clamped by said wires and thus firmly held over said openings whereby said sheet material is positioned for stretch-wrapping operations, and driven take-off means aligned with said cage whereby the stretchable sheet material is conveyed away from the cage in a continuous length containing the articles wrapped and means for severing the packages containing the articles wrapped from the said continuous length of sheet material.

5. A machine of the class described comprising a rotatable cage comprising annular open end members connected by circumferentially spaced cross-members defining between them a plurality of circumferential cage openings for the passage of successive articles to be wrapped, means for rotating said cage, means for supplying stretchable sheet material to the periphery of said cage to cover said openings, means for clamping the side edges of said sheet material to the annular end members of the cage, and means for heating the sheet material, the cage and the holding means being so proportioned and arranged as to permit manual operations on the sheet material both within and without the cage.

6. A machine of the class described comprising a rotatable cage having annular end members connected by circumferentially spaced cross-members defining between them a plurality of openings for passage of articles to be wrapped, means for rotating said cage continuously, a pair of endless clamping wires operable in substantial arcuate contact with the peripheries of the end members of the cage, and means for supplying stretchable sheet material to the periphery of the cage so that edge portions of said sheet material will be clamped by said wires and thus firmly held adjacent said openings whereby said sheet material is positioned for stretch-wrapping operations.

7. A machine of the class described comprising an open rotatable cage having annular end members connected by circumferentially spaced cross-members defining between them a plurality of openings for passage of articles to be wrapped, said annular end members of the cage being of sufficiently large diameter to permit endwise insertion of an operator's hands for performance of manual operations within the cage, means for rotating the cage, clamping members disposed in substantial arcuate contact against the peripheries of the end members of the cage, and means for supplying stretchable sheet material to the periphery of the cage so that edge portions of said sheet material will be clamped by said clamping means and thus firmly held over the openings in the cage, whereby said sheet material is positioned for stretch-wrapping operations.

8. A machine of the class described comprising a single rotatable cage supported on rollers and having annular end members connected by circumferentially spaced cross-members defining between them a plurality of openings for passage of successive articles to be wrapped, means for rotating said cage, means for supplying stretchable sheet material to the periphery of said cage to overlie said openings, means for clamping the side edges of said sheet material to the annular end members of the cage, said clamping means being so positioned and proportioned as to give unobstructed access at the zones outside and inside said cage adjacent the sheet clamping portion of the cage.

9. A machine of the class described comprising a single rotatable cage supported on rollers and having annular end members connected by circumferentially spaced cross-members defining between them a plurality of openings for passage of successive articles to be wrapped, means for rotating said cage, means for supplying stretchable sheet material to the periphery of said cage to overlie said openings, means for clamping the side edges of said sheet material to the annular end members of the cage, said clamping means being so positioned and proportioned as to give unobstructed access at the zones outside and inside said cage adjacent the sheet clamping portion of the cage, and means for heating the sheet material.

10. A machine of the class described comprising a single rotatable cage supported on rollers and having annular end members connected by circumferentially spaced cross-members defining between them a plurality of openings for passage of successive articles to be wrapped, means for rotating said cage, means for supplying stretchable sheet material to the periphery of said cage to overlie said openings, means for clamping the side edges of said sheet material to the annular end members of the cage, said clamping means being so positioned and proportioned as to give unobstructed access at the zones outside and inside said cage adjacent the sheet clamping portion of the cage, and means for softening the sheet material to temporarily increase its stretchability.

11. In a stretch-wrapping machine, arcuate supporting means to support edge portions of a strip of wrapping material, means for width wide adjustment of said machine, endless band clamping means arcuately associated with said supporting means for a substantial distance along the periphery of the said supporting means, means for feeding the sheet material endwise to said supporting mean, and means for softening said sheet material to increase its extensibility.

12. A method of wrapping which consists in providing a relatively long strip of sheet wrapping material which is substantially inextensible at normal temperatures but capable of softening and being rendered stretchable at elevated temperatures, clamping successive edge portions of said strip while leaving the central portions unsupported and unobstructed, feeding the strip endwise a substantial distance while it is so clamped, heating the strip material to render it stretchable, and enclosing an article to be wrapped at least partially by stretching said sheet material by pressing the surface of the article against said strip material.

13. A machine of the class described comprising a rotatable cage having annular end members connected by circumferentially spaced cross members defining between them a plurality of openings for passage of articles to be wrapped, means for rotating said cage continuously, clamping means operable in substantial arcuate contact with the peripheries of the end members of the cage, and means for supplying stretchable sheet material to the periphery of the cage so that edge portions of said sheet material will be clamped by said clamping means and thus firmly held over said openings whereby said sheet material is positioned for stretch-wrapping operations.

14. A machine of the class described comprising a rotatable cage having annular end members connected by circumferentially spaced cross members defining between them a plurality of openings for passage of articles to be wrapped, clamping means operable in substantial arcuate contact with the peripheries of the end members of the cage, and means for supplying stretchable sheet material to the periphery of the cage so that edge portions of said sheet material will be clamped by said clamping means and thus firmly held over said openings whereby said sheet material is positioned for stretch-wrapping operations.

15. A machine of the class described comprising a rotatable cage having annular end members connected by circumferentially spaced cross members defining between them a plurality of openings for passage of articles to be wrapped, clamping means operable in substantial arcuate contact with the peripheries of the end members of the cage, and means for supplying stretchable sheet material to the periphery of the cage so that edge portions of said sheet material will be clamped by said clamping means and thus firmly held over said openings whereby said sheet material is positioned for stretch-wrapping operations, and driven take-off means aligned with said cage whereby the stretchable sheet material is conveyed away from the cage in a continuous length containing the articles wrapped and means for severing the packages containing the articles wrapped from the said continuous length of sheet material.

FRED B. PFEIFFER.